United States Patent
Luo

(10) Patent No.: US 9,792,473 B2
(45) Date of Patent: Oct. 17, 2017

(54) CARD SWIPING METHOD AND DEVICE FOR DETERMINING MOBILE TERMINAL FOR SWIPING CARD, UTILIZING INTENSITY OF ULTRASONIC SIGNAL

(71) Applicant: Weixi Luo, Shenzhen (CN)

(72) Inventor: Weixi Luo, Shenzhen (CN)

(73) Assignees: Weixi Luo, Shenzhen (CN); SHENZHEN ULTRASONICPAY TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 14/759,933

(22) PCT Filed: Jan. 10, 2013

(86) PCT No.: PCT/CN2013/070294
§ 371 (c)(1),
(2) Date: Jul. 9, 2015

(87) PCT Pub. No.: WO2014/107859
PCT Pub. Date: Jul. 17, 2014

(65) Prior Publication Data
US 2015/0356331 A1    Dec. 10, 2015

(51) Int. Cl.
*G06K 9/00* (2006.01)
*G06K 7/10* (2006.01)
(Continued)

(52) U.S. Cl.
CPC ........... *G06K 7/10257* (2013.01); *G01H 3/10* (2013.01); *G06K 7/10118* (2013.01);
(Continued)

(58) Field of Classification Search
CPC ............... G01H 3/10; G06K 19/07309; G06K 7/10118; G06K 7/10257; H04W 88/02;
(Continued)

(56) References Cited

U.S. PATENT DOCUMENTS

| 2009/0134223 A1* | 5/2009 | Matthews | A45C 11/182 235/441 |
| 2013/0024308 A1* | 1/2013 | Ramaswamy | G07G 1/0081 705/18 |

(Continued)

*Primary Examiner* — Dionne H Pendleton
(74) *Attorney, Agent, or Firm* — PROI Intellectual Property US

(57) ABSTRACT

The present invention relates to a card swiping method for determining card swiping of a mobile terminal by using ultrasonic signal strength, comprising: closely contacting, by a mobile terminal, a card reading device, wherein a multi-interface integrated circuit module in the mobile terminal receives a ultrasonic signal transmitted by an ultrasonic wave transmitting module in the card reading device; measuring, by the multi-interface integrated circuit module, strength of the received ultrasonic signal, and comparing the measured strength with an ultrasonic signal strength threshold which allows card swiping; and if the strength of the received ultrasonic signal received by the multi-interface integrated circuit module is greater than the ultrasonic signal strength which allows card swiping, interactively performing card swiping procedures by the multi-interface integrated circuit module and the card reading device.

7 Claims, 7 Drawing Sheets

(51) Int. Cl.
*G06K 7/06* (2006.01)
*G01H 3/10* (2006.01)
*H04W 88/08* (2009.01)
*G06K 19/00* (2006.01)
*H04B 5/00* (2006.01)
*G06K 19/073* (2006.01)
*H04W 88/02* (2009.01)

(52) U.S. Cl.
CPC ....... *G06K 9/0002* (2013.01); *G06K 9/00033* (2013.01); *G06K 19/005* (2013.01); *G06K 19/07309* (2013.01); *H04B 5/0062* (2013.01); *H04W 88/08* (2013.01); *H04W 88/02* (2013.01)

(58) Field of Classification Search
CPC .......... H04W 4/02; H04W 4/04; H04B 11/00; H04B 5/0031; G06Q 20/3272; G06Q 20/3278; G06Q 20/40; G06Q 30/00; G06Q 30/0238
See application file for complete search history.

(56) References Cited

U.S. PATENT DOCUMENTS

2013/0171930 A1* 7/2013 Anand ................. H04B 5/0031
  455/41.1
2015/0242855 A1* 8/2015 Vilnai ...................... B67D 7/34
  705/44
2016/0219174 A1* 7/2016 Umeda .............. H04N 1/00891

\* cited by examiner

CARD SWIPING METHOD AND DEVICE FOR DETERMINING MOBILE TERMINAL FOR SWIPING CARD, UTILIZING INTENSITY OF ULTRASONIC SIGNAL

CROSS REFERENCE TO RELATED APPLICATIONS

The present application is the US national stage of International Patent Application PCT/CN2013/070294 filed on Jan. 10, 2013.

TECHNICAL FIELD

The present invention relates to electronic payment technologies, and more particularly, relates to a card swiping method and apparatus for determining card swiping of a mobile terminal by using ultrasonic signal strength.

BACKGROUND

Patent application CN102810145A has disclosed a method and apparatus for card reading through mobile terminal within safety distance determined by ultrasonic wave. According to the method and apparatus, the distance between a mobile terminal and a card reading device is measured according to the propagation time of the ultrasonic wave in the air, which prevents the measurement from cheating and attacks. However, the method still has the following defects:

Firstly, although the card swiping distance can be ensured within a predefined secure distance, an attacker may perform card swiping within the predefined secure distance with no need of making the card reading device in close contact with the mobile terminal, thereby acquiring money and other information from the mobile terminal. Since the money is in a very small amount, the owner of the mobile terminal may fail to detect such loss. Even if the owner detects the loss, the owner still finds it very difficult to find any evidence or find it unworthy to spend time to find any evidence for getting back the loss.

Secondly, the ultrasonic sensor is configured on the multi-interface integrated circuit card in the mobile terminal. Since the shell of the mobile terminal exerts a resistant effect to the ultrasonic wave, the ultrasonic signals reaching the ultrasonic sensor are subjected to great attenuation. A majority of mobile terminals fail to receive sufficiently strong ultrasonic signals, or may receive the signals only when the ultrasonic wave strength is enhanced to a great value. This increases the cost and power consumption of the card reading device, and limits the application scope of the card reading device. In this way, the adaptability of the multi-interface integrated circuit card is restricted, and thus card swiping within a secure distance fail to be implemented by using the ultrasonic wave in most mobile terminals.

SUMMARY

The technical problem to be solved in the present invention is to restrict a card swiping distance by using ultrasonic signal strength, and ensure security of the card swiping distance. According to the present invention, once card swiping is performed, the owner of a mobile terminal can immediately know the card swiping. If unauthorized card swiping occurs, the owner of the mobile terminal is capable of taking proper measures.

To solve the above technical problem, the present invention employs the following technical solutions:

A card swiping method for determining card swiping of a mobile terminal by using ultrasonic signal strength, comprising:

closely contacting, by a mobile terminal, a card reading device, wherein a multi-interface integrated circuit module in the mobile terminal receives a ultrasonic signal transmitted by an ultrasonic wave transmitting module in the card reading device;

measuring, by the multi-interface integrated circuit module, strength of the received ultrasonic signal, and comparing the measured strength with an ultrasonic signal strength threshold which allows card swiping; and if the strength of the received ultrasonic signal received by the multi-interface integrated circuit module is greater than the ultrasonic signal strength which allows card swiping, interactively performing card swiping procedures by the multi-interface integrated circuit module and the card reading device.

Further, the ultrasonic signal strength threshold which allows card swiping is defined by:

selecting a batch of mobile terminals of a specific model, respectively measuring a maximum strength of an ultrasonic signal transmitted by the card reading device and received by an ultrasonic sensor in each of the mobile terminals when each of the mobile terminal is not in contact with the card reading device, wherein the maximum strength is referred to as a non-contact maximum strength; and defining an ultrasonic signal strength threshold, which allows card swiping, of the mobile terminal of the model as the non-contact maximum strength.

during card swiping, the multi-interface integrated circuit module determines, according to the defined ultrasonic signal strength threshold which allows card swiping, whether to perform card swiping, and records a maximum ultrasonic signal strength measured during card swiping and compares 1/K of the measured maximum ultrasonic signal strength with the defined ultrasonic signal strength threshold which allows card swiping; if the 1/K of the measured maximum ultrasonic signal strength is greater than the defined ultrasonic signal strength threshold which allows card swiping, the multi-interface integrated circuit module refreshes the defined ultrasonic signal strength threshold which allows card swiping to 1/K of the measured maximum ultrasonic signal strength, wherein K is in the range of 2 to 100.

Further, the ultrasonic signal strength threshold which allows card swiping in the multi-interface integrated circuit module is adaptively defined by:

powering on the mobile terminal whereupon the multi-interface integrated circuit module in the mobile terminal performs first card swiping upon power-on of the mobile phone, and ensuring security of card swiping by means of enabling a distance between the multi-interface integrated circuit module and the card reading device to be less than a secure distance threshold;

measuring, by the multi-interface integrated circuit, ultrasonic signal strength during the first card swiping, and recording measured maximum ultrasonic signal strength; and defining the ultrasonic signal strength threshold which allows card swiping as 1/K of the measured maximum ultrasonic signal strength, wherein K is preferably in the range of 2 to 100.

During next card swiping upon adaptively defining the ultrasonic signal strength threshold during the first card swiping, the multi-interface integrated circuit module records a maximum ultrasonic signal strength measured during card swiping, and compares 1/K of the measured maximum ultrasonic signal strength with the previously defined ultrasonic signal strength threshold which allows card swiping; if the 1/K of the measured maximum ultrasonic signal strength is greater than the previously defined ultrasonic signal strength threshold which allows card swiping, the multi-interface integrated circuit module refreshes the defined ultrasonic signal strength threshold which allows card swiping to 1/K of the measured maximum ultrasonic signal strength, wherein K is in the range of 2 to 100.

An ultrasonic sensor of the multi-interface integrated circuit module is configured inside an interlayer of a shell of the mobile terminal or on an inner surface of a shell of the mobile terminal.

A card swiping apparatus for determining card swiping of a mobile terminal by using ultrasonic signal strength, comprising:

a control circuit, a card swiping function module, an ultrasonic wave receiving module and a radio reception-transmission processing module that are respectively electrically coupled to the control circuit; wherein the ultrasonic wave receiving module comprises an ultrasonic sensor and an ultrasonic wave reception processing circuit, the ultrasonic reception processing circuit comprises an ultrasonic wave strength measuring circuit; the ultrasonic sensor is configured to receive an ultrasonic signal transmitted by an ultrasonic wave transmitting module of an external card reading device; the ultrasonic wave reception processing circuit processes an ultrasonic signal transmitted by the ultrasonic sensor and measures ultrasonic signal strength; and the card swiping function module is configured to interactively perform, together with the card reading device, card swiping procedures under control of the control circuit if the strength of the received ultrasonic signal is greater than the ultrasonic signal strength which allows card swiping.

Further, the card swiping apparatus further comprises a radio reception-transmission processing module electrically coupled to the control circuit, configured to perform two-way radio data information exchange with an external card reading device.

Compared with the prior art, the present invention achieves the following beneficial effects:

Card swiping may be performed only by closely contacting the mobile terminal with the card reading device. Once card swiping is performed (including unauthorized card swiping), the owner of the mobile terminal can immediately know the unauthorized card swiping. If authorized card swiping occurs, the owner of the mobile terminal is capable of taking proper measures, such that the card swiping theft gains nothing and may be caught onsite. In addition, electronic data evidence is maintained in the mobile terminal, the owner of the card reading device may be found based on the electronic data, and may recover the electronic currency stolen via unauthorized card swiping.

DETAILED DESCRIPTION

Figure 1:
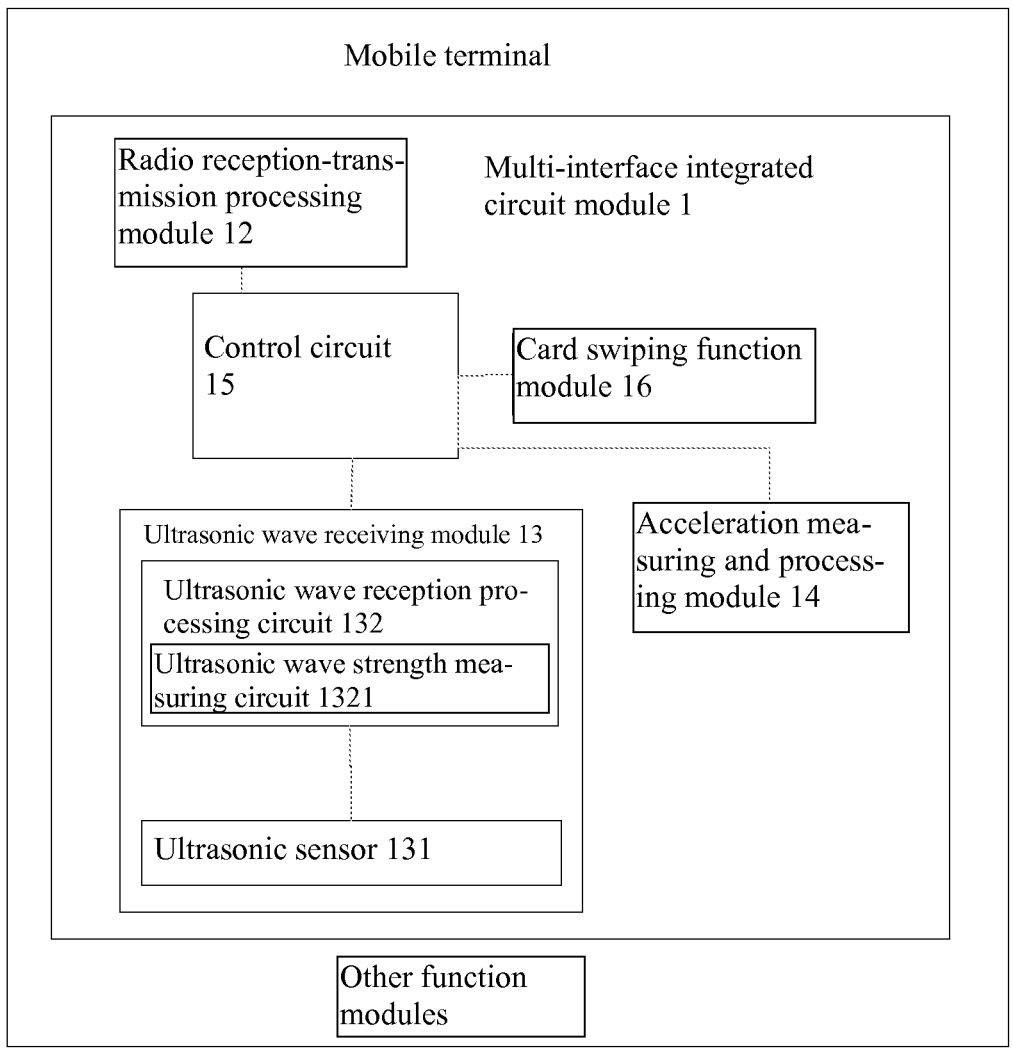
FIG. 1 is a schematic diagram of a multi-interface integrated circuit module configured in a mobile terminal according to the present invention.

The present invention is further described with reference to preferred embodiments as illustrated in the accompanying drawings.

Terms and Definitions Thereof

Multi-interface integrated circuit module: has two or more than two interfaces for exchanging information and energy with the ambient environment. The main interfaces include: a wired interface, a radio interface, an ultrasonic receiving interface, and an acceleration receiving interface.

Mobile terminal: is light-weighted and may be power-supplied by a battery, which is an electronic device that can be used without connection to another electronic device via an electric cable. The mobile terminal as described herein includes but not limited to an MP3 player, a palm game player, a GPS, a personal digital assistant (PDA), a digital camera, an electronic dictionary, a handheld cash register, a mobile phone, a smart phone, and the like.

Card swiping: is a communication and data information exchange process between a multi-interface integrated circuit module and a card reading device, and involves creation, storage, modification, reading, verification, comparison, and processing of the data information of the multi-interface integrated circuit module during card swiping. The card swiping described herein covers electronic payment and secure access control.

According to the propagation law of the ultrasonic wave, the ultrasonic wave has an acoustic impedance of 430 kgm$^{-2}$ S$^{-1}$ in an air propagation medium, and has an acoustic impedance of 3.2×10$^6$ kgm$^{-2}$ S$^{-1}$ in a solid propagation medium (the acoustic impedance of a typical nylon). The solid medium and the air medium are subjected to a great difference in terms of acoustic impedance. The acoustic impedance of the solid medium is about 7000 times of the acoustic impedance of the air medium. According to the propagation law of the ultrasonic wave, when the ultrasonic wave propagates through an interface between the solid and the air, the ultrasonic wave propagates from the gas to the solid, or propagates from the solid to the gas. During such propagation, the majority of the ultrasonic signals are reflected back, and only a small number of ultrasonic signals are capable of passing through the interface between the solid and the air and reaching different media.

The transmission coefficient =

$$\frac{4*R1*R2}{(R1+R2)^2} \approx \frac{4*430*3.2*10^6}{(430+3.2*10^6)^2} \approx 0.000538 = \frac{1}{1860},$$

wherein R1 and R2 are acoustic impedances of different materials on two sides of the interface. Accordingly, the transmitted ultrasonic signals may be subjected to over 1000-fold attenuation. To be specific, the transmitted ultrasonic signal is less than one thousand of the original ultrasonic signal.

The method of restricting the card swiping distance by using the ultrasonic signal strength is: closely contacting the mobile terminal with the card reading device, and ensuring sufficiently great pressure on the contact surface. The mobile terminal allows card swiping if the ultrasonic signal received by the ultrasonic sensor in the mobile terminal exceeds the ultrasonic signal strength threshold predefined in the mobile terminal. Card swiping is allowed only with a sufficient contact pressure, and therefore, the owner of the mobile terminal may immediately know card swiping when card swiping is performed.

The ultrasonic sensor may be installed using the following two methods:

Installation method 1: The ultrasonic sensor is installed in an inner space enclosed by the shell of the mobile terminal. For example, the ultrasonic sensor is installed on an integrated circuit card, typically on a SIM card which is installed in the mobile terminal. Still for example, the ultrasonic sensor is installed on a PCB in the inner space enclosed by the shell of the mobile terminal.

Figure 5:
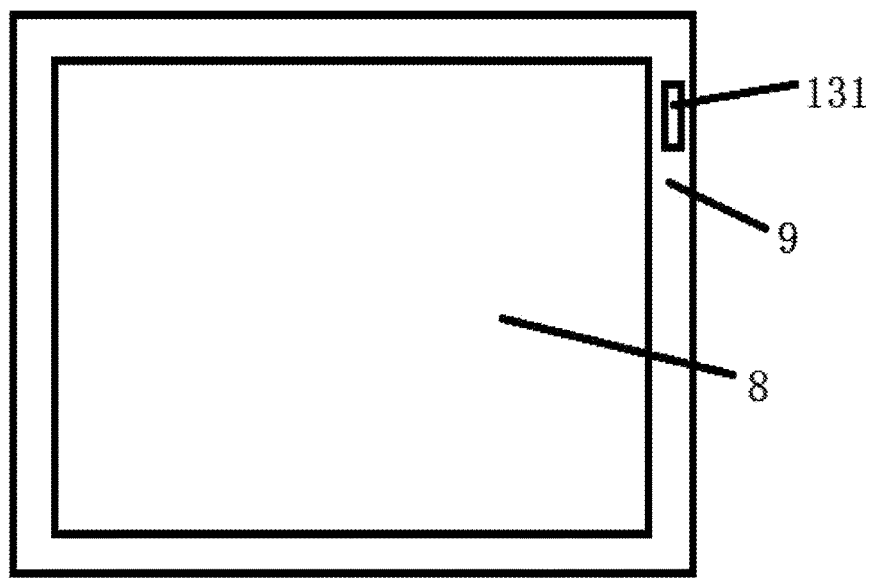
FIG. 5 illustrates an embodiment of an installation position of an ultrasonic sensor according to the present invention.
Figure 6:
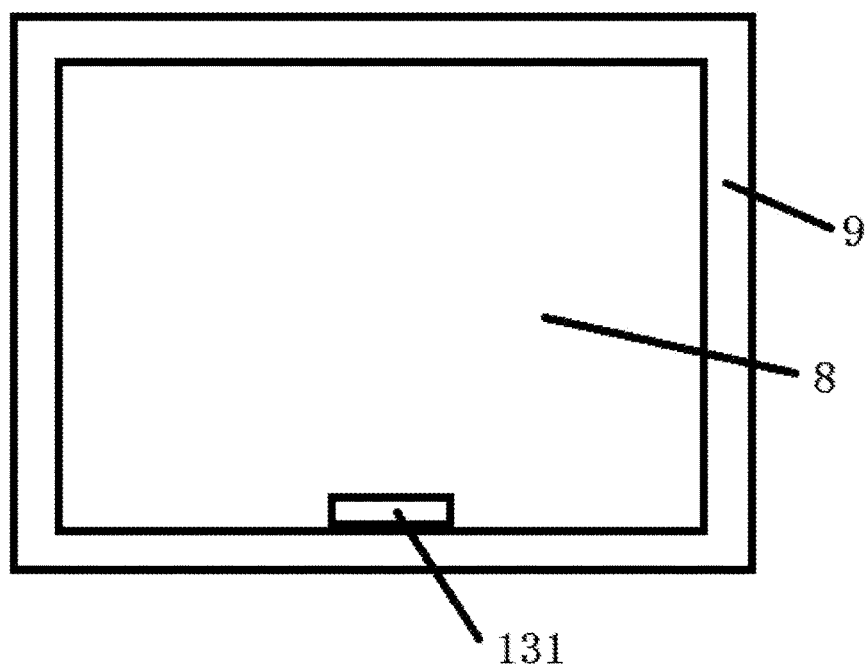
FIG. 6 illustrates another embodiment of an installation position of an ultrasonic sensor according to the present invention.

Installation method 2: The ultrasonic sensor is installed inside an interlayer of the shell of the mobile terminal, as illustrated in FIG. 5, or installed on an inner surface of the shell of the mobile terminal, as illustrated in FIG. 6. The ultrasonic sensor 131 as illustrated in FIG. 5 is installed inside the interlayer of the shell of the mobile terminal, wherein 9 denotes the shell of the mobile terminal, 8 denotes the inner space enclosed by the shell of the mobile terminal. The ultrasonic sensor 131 as illustrated in FIG. 6 is installed on the inner surface of the shell of the mobile terminal, wherein 8 denotes the shell of the mobile terminal, 8 denotes the inner space enclosed by the shell of the mobile terminal.

When the ultrasonic sensor is installed in the inner space enclosed by the shell of the mobile terminal, if the mobile terminal is not in contact with the card reading device, the ultrasonic wave is radiated from the card reading device to the air, propagates from the air to the shell of the mobile terminal, propagates through the shell of the mobile terminal to the air inside the mobile terminal, and then propagates through the air inside the mobile terminal to the ultrasonic sensor. If the mobile terminal is in contact with the card reading device, the ultrasonic wave propagation path is as follows: The ultrasonic wave is firstly transmitted from the card reading device through an interface between solids and propagates to the shell of the mobile terminal, propagates to the air inside the mobile terminal, and then propagates through the air inside the mobile terminal to the ultrasonic sensor. Relative to the case where the mobile terminal is not in contact with the card reading device, the ultrasonic wave propagation path between the mobile terminal and the card reading device does not involve the interface between the solid and the gas, which greatly improves the strength of the signal received by the ultrasonic sensor. Since the mobile terminal is in close contact with the card reading device and the contact surface is subjected to a sufficient pressure, the ultrasonic energy can be smoothly transferred from the card reading device to the shell of the mobile terminal.

When the ultrasonic sensor is installed inside the interlayer or inner surface of the shell of the mobile terminal, if the mobile terminal is not in contact with the card reading device, the ultrasonic wave is radiated from the card reading device to the air, propagates from the air to the shell of the mobile terminal, and then propagates through the solid medium of the shell of the mobile terminal to the ultrasonic sensor inside of the interlayer of the shell of the mobile terminal or to the ultrasonic sensor on the inner surface of the shell of the mobile terminal. If the mobile terminal is in contact with the card reading device, the ultrasonic wave propagation path is as follows: The ultrasonic wave is firstly transmitted from the card reading device through an interface between solids and propagates to the shell of the mobile terminal, and then propagates through the solid medium of the shell of the mobile terminal to the ultrasonic sensor inside of the interlayer of the shell of the mobile terminal or to the ultrasonic sensor on the inner surface of the shell of the mobile terminal. Relative to the case where the mobile terminal is not in contact with the card reading device, the ultrasonic wave propagation path between the mobile terminal and the card reading device does not involve the propagation through the interface between the solid and the gas, which greatly improves the strength of the signal received by the ultrasonic sensor. Since the mobile terminal is in close contact with the card reading device and the contact surface is subjected to a sufficient pressure, the ultrasonic energy can be smoothly and directly transferred from the card reading device to the shell of the mobile terminal.

Accordingly, if the mobile terminal fails to be in close contact with the card reading device, the process that the ultrasonic wave is transmitted from the card reading device to the shell of the mobile terminal may be subjected to two more propagation processes through the interface between the solid and the gas, two more 1000-fold attenuations, total 1000000-fold attenuation. As such, almost no ultrasonic energy can reach the ultrasonic sensor. The practice proves that if the mobile terminal is made in close contact with the card reading device, the ultrasonic sensor is capable of receiving sufficiently strong signals, and thus card swiping may be performed; otherwise, it is difficult to perform card swiping.

Therefore, as long as the ultrasonic signal strength threshold, received by the ultrasonic sensor in the mobile terminal, which allows card swiping is defined to a suitable value, and such value matches the mobile terminal of the model, the ultrasonic signal strength received by the ultrasonic sensor may exceed the threshold if the mobile terminal is made in close contact with the card reading device, thereby implementing card swiping only in the case of close contact of the mobile terminal and the card reading device.

Under circumstances where mild security requirements are imposed, the mobile terminal compares a measurement result of the ultrasonic signal strength with the threshold. Once the measured ultrasonic signal strength is greater than the threshold, subsequent card swiping can be performed. However, under scenarios where high security requirements are imposed, for example, card-swiping payment at stalls or flea markets, the mobile terminal needs to measure the ultrasonic signal strength and compare the measured strength with the threshold during the entire card swiping process. Once the ultrasonic signal strength is less than the threshold, the card swiping process is interrupted.

Preferably, the ultrasonic signal strength threshold which allows card swiping may be defined using the following methods:

Method 1: A batch of mobile terminals of the same model are selected, with respect to each mobile terminal, maximum strength of the ultrasonic signal received by the ultrasonic sensor in the mobile terminal is measured when the mobile terminal is not in contact with the card reading device, and maximum strength of the ultrasonic signal is selected from the strength of all the measured mobile terminals, which is referred to as non-contact maximum strength. An ultrasonic signal strength threshold, which allows card swiping, of the mobile terminal of the model is defined as the non-contact maximum strength. Through the test, it may be found that with respect to most types of mobile terminals, when the mobile terminal is not in contact with the card reading device, the ultrasonic signal is subjected to extremely great attenuation, and the ultrasonic sensor in the mobile terminal fails to receive valid ultrasonic signals, but receives noise signals. With respect to the mobile terminal of such model, the ultrasonic signal strength threshold which allows card swiping needs to be defined as a strength value greater than the strength of the noise signal.

Figure 2:
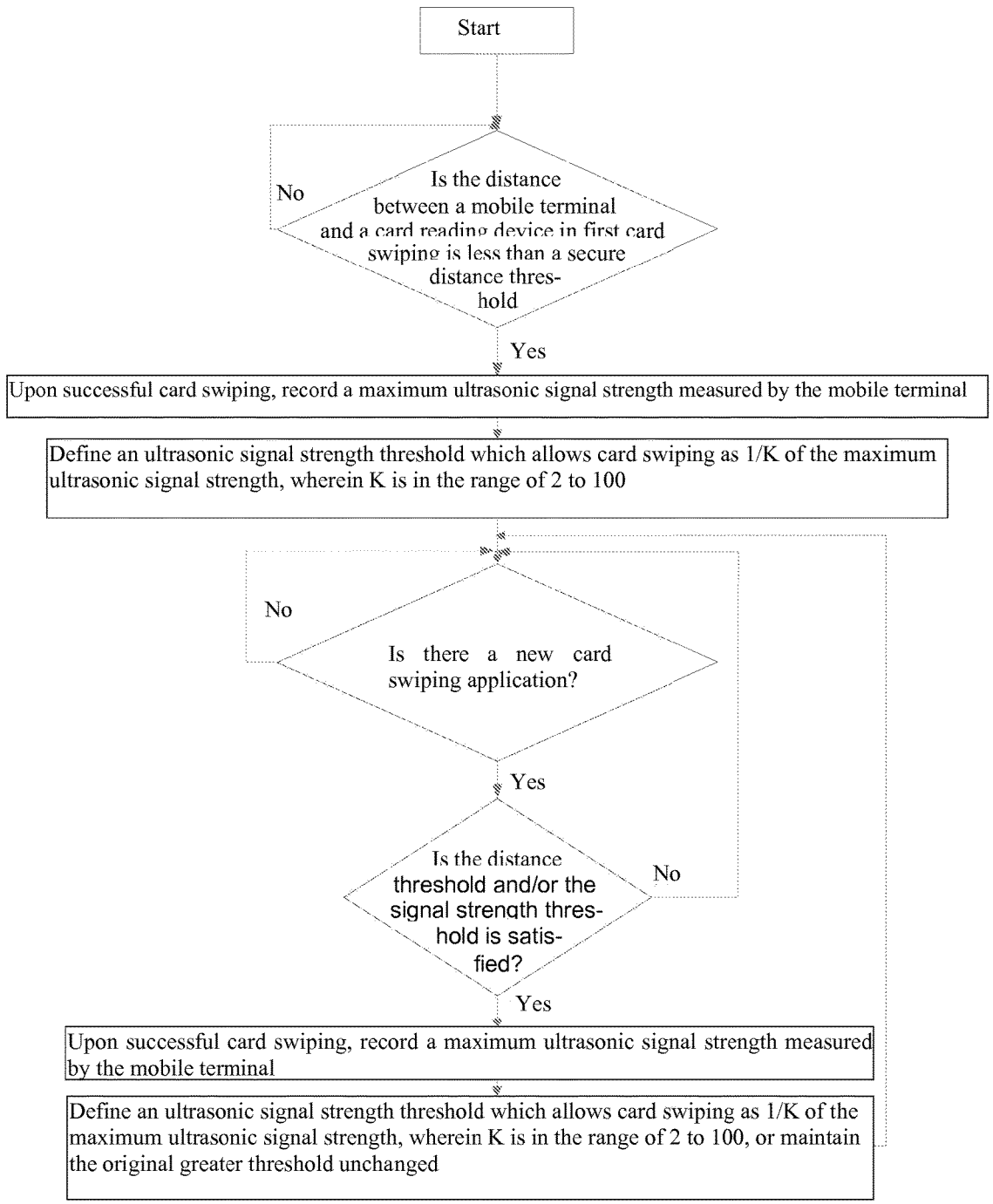
FIG. 2 is a schematic flowchart of defining an ultrasonic signal strength threshold according to the present invention.

Method 2: The ultrasonic signal strength threshold which allows card swiping is adaptively defined, as illustrated in FIG. 2, including the following steps:

Step 1: After the mobile terminal is powered on, during first card swiping, whether to perform card swiping is determined using another method. Upon successful card swiping, the maximum ultrasonic signal strength received by the mobile terminal during the entire card swiping process is recorded, and the mobile terminal defines a subsequent ultrasonic signal strength which allows card swiping to 1/K of the maximum strength. K is preferably in the range of 2 to 100. If the value of K is too small, card swiping may be insensitive. If the value of K is too great, card swiping may be still performed even when the mobile terminal is not in contact with the card swiping device, thereby reducing the security of card swiping. Subsequently, the mobile terminal determines whether to perform card swiping according to the ultrasonic signal strength threshold which allows card swiping. Another determining method, with respect to the card reading device imposing higher security requirements, may be an ultrasonic distance measuring method capable of preventing proofing attacks. If the distance between the card reading device and the mobile terminal is less than a predefined secure distance, the mobile terminal is allowed for card swiping; and otherwise, card swiping is denied. For the ultrasonic distance measuring method capable of preventing sproofing attacks, reference may be made to the disclosure of the application document CN102810145A. With respect to the card reading device imposing not high security requirements, the distance may be measured by using a conventional distance measuring method.

Step 2: In each subsequent card swiping, whether to perform card swiping is determined according to the ultrasonic signal strength threshold which allows card swiping; and the mobile terminal records the maximum ultrasonic signal strength during the entire card swiping process, calculates a new ultrasonic signal strength threshold according to the ratio of 1/K as described in step 1 (K is preferably in the range of 2 to 100), and compares the new ultrasonic signal strength threshold with the previous ultrasonic signal strength threshold and takes the greater threshold as an ultrasonic signal strength threshold which allows card swiping, for next use.

Whether to perform card swiping is determined according to the ultrasonic signal strength threshold which allows card swiping, except the first card swiping, in the subsequent card swiping, or through multiple card swiping processes, card swiping may be performed only when the mobile terminal is in close contact with the card reading device. Although unauthorized card swiping may not be prevented in the first card swiping and first card swiping processes, the probability of unauthorized card swiping may be greatly reduced, such that card swiping theft gains no chance, and profit via the unauthorized card swiping is much less than the time and resource paid for unauthorized card swiping. In addition, the risks of being caught stealing to swipe the card is great.

Method 3: The ultrasonic signal strength threshold which allows card swiping is adaptively adjusted. The method includes the following steps: After the mobile terminal of model is powered on again, whether to perform card swiping is determined according to the ultrasonic signal strength threshold which allows card swiping by using method 1. During the subsequent card swiping upon the first card swiping, the mobile terminal records the maximum ultrasonic signal strength received during the entire card swiping process is recorded, and defines a subsequent ultrasonic signal strength which allows card swiping to 1/K of the maximum strength. K is preferably in the range of 2 to 100. The mobile terminal compares the determined threshold with the previous ultrasonic signal strength threshold, and takes the greater threshold as an ultrasonic signal strength threshold which allows card swiping, for next use.

To ensure security in card swiping by using the defined ultrasonic signal strength threshold which allows card swiping, a mobile terminal apparatus is designed, as illustrated in FIG. 1. An inner circuit of the mobile terminal apparatus comprises a multi-interface integrated circuit module 1, wherein the multi-interface integrated circuit module 1 comprises a control circuit 15, a radio reception-transmission processing module 12, an ultrasonic wave receiving module 13, and a card swiping function module 16. The radio reception-transmission processing module 12 is electrically coupled to the control circuit 15, and is configured to implement two-way exchange of radio data information with an external card reading device. The ultrasonic wave receiving module 13 is electrically coupled to the control circuit 15; and receives an ultrasonic signal transmitted by the external card reading device, acquires data information transmitted by the card reading device from the received ultrasonic signal, and acquires via calculation a distance between the mobile terminal and the card reading device according to ultrasonic wave propagation time. In addition, the ultrasonic wave receiving module 13 measures the strength of the received ultrasonic signal, and compares the strength of the received ultrasonic signal with the defined ultrasonic signal strength threshold which allows card swiping, to determine whether to perform card swiping. The ultrasonic wave receiving module 13 comprises an ultrasonic sensor 131 and an ultrasonic wave reception processing circuit 132, wherein the ultrasonic sensor 131 is coupled to the ultrasonic wave reception processing circuit 132. The ultrasonic sensor 131 converts an ultrasonic signal into an ultrasonic electric signal, and transmitted the ultrasonic electric signal to the ultrasonic wave reception processing circuit 132. The ultrasonic wave reception processing circuit 132 processes the ultrasonic signal transmitted by the ultrasonic sensor 131, measures the strength of the ultrasonic signal, and demodulates and decodes data information therein. The distance between the mobile terminal and the card reading device is calculated according to the propagation time of the ultrasonic wave. The ultrasonic sensor 131 is installed in an inner space enclosed by the shell of the mobile terminal, and the ultrasonic sensor is installed on a SIM card or installed on the PCB in the inner space enclosed by the shell of the mobile terminal. The ultrasonic sensor 131 may be further installed inside an interlay and on an inner surface of the shell of the mobile terminal, as illustrated in FIG. 5 and FIG. 6. The ultrasonic sensor 131 as illustrated in FIG. 5 is installed inside the interlayer of the shell of the mobile terminal, wherein 9 denotes the shell of the mobile terminal, 8 denotes the inner space enclosed by the shell of the mobile terminal. The ultrasonic sensor 131 as illustrated in FIG. 6 is installed on the inner surface of the shell of the mobile terminal, wherein 8 denotes the shell of the mobile terminal, 8 denotes the inner space enclosed by the shell of the mobile terminal. The ultrasonic wave reception processing circuit 132 comprises an ultrasonic wave strength measuring circuit 1321. The ultrasonic wave strength measuring circuit 1321 measures the strength of an ultrasonic signal received by the ultrasonic sensor 131. The card swiping function module 16 is coupled to the control circuit 15, and collaboratively performs a card swiping operation with the external card reading device and the mobile terminal under control of the control circuit 15.

The multi-interface integrated circuit module 1 further comprises an optional acceleration measuring and processing module 14, wherein the acceleration measuring and processing module 14 is electrically coupled to the control circuit 15, and comprises an acceleration sensor and a processing circuit. The acceleration measuring and processing module 14 receives and processes acceleration variation information thereof, to identify a specific motion action thereof.

Figure 3:
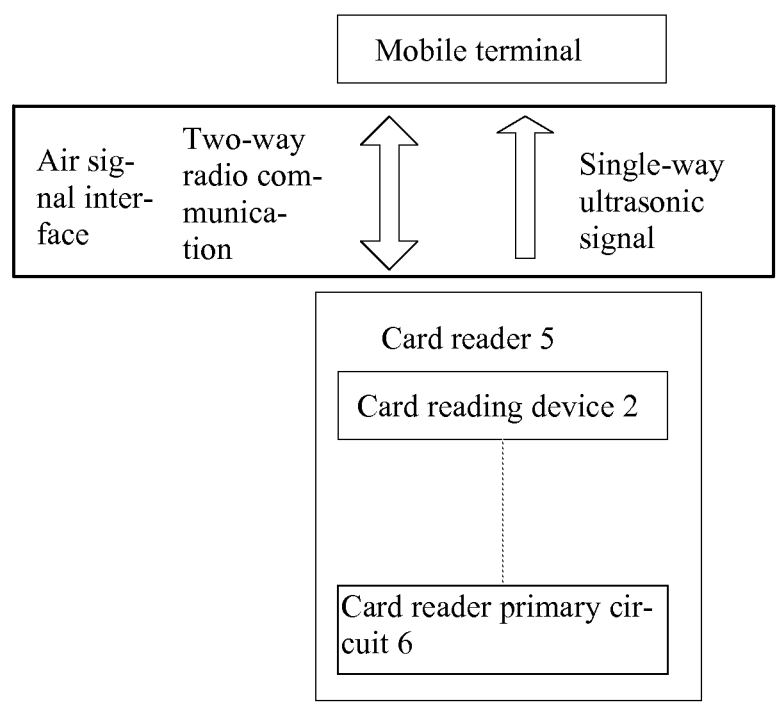
FIG. 3 is a schematic diagram of communication between a mobile terminal and a card reading device according to the present invention.
Figure 4:
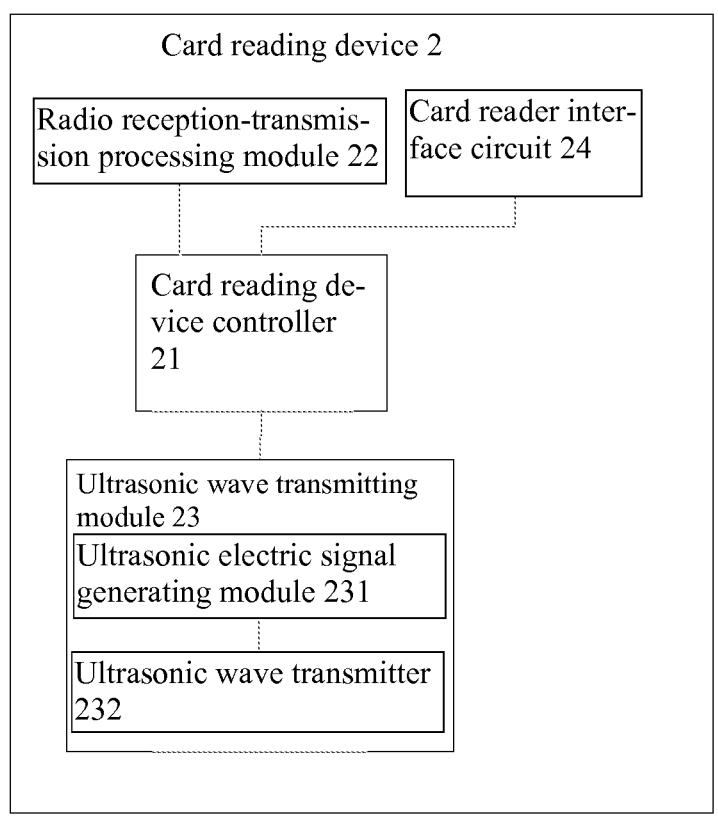
FIG. 4 is a schematic block diagram of a card reading device according to the present invention.

Embodiment 1: Application in Secure Access Control, Wherein an Ultrasonic Signal Strength Threshold which Allows Card Swiping is Determined Adaptively As illustrated in FIG. 3, a card reader for use in secure access control of a company comprises a card reader primary circuit 6 and a card reading device 2, wherein an inner structure of the card reading device 2 is as illustrated in FIG. 4, and software and hardware that are communicated with a computer-based attendance management system of the company. The mobile terminal is the mobile terminal of an employee. The card swiping function module 16 configured in the multi-interface integrated circuit in the mobile terminal comprises attendance card swiping software and employee identity information. The multi-interface integrated circuit module is a SIM card, wherein an ultrasonic sensor is configured in the SIM card and the SIM card is installed in the mobile phone. Since the attendance secure access control impose not very high security requirements, the employee does not need to confirm the operation. Therefore, the optional acceleration measuring and processing module 14 does not need to be configured in the mobile terminal applied in such a scenario. Even if the optional acceleration measuring and processing module 14 is configured in the mobile terminal, the acceleration measuring and processing module 14 may not be used. The first card swiping operation via the mobile phone of the employee is as follows: An ultrasonic wave transmitting module 23 of the card reading device 2 uninterruptedly transmits ultrasonic signals containing data information to recognize the card, wherein the data information comprises the frequency of a radio signal, the modulation mode, the protocol, the identity and authentication code and the like of the card reading device. In addition, a radio reception-transmission processing module 22 of the card reading device 2 stays in a receiving state, and waits for the radio signals transmitted by the multi-interface integrated circuit module. When the employee enters or exits the door of the company, the mobile phone of the employee is in close contact with the card reading device 2, and the ultrasonic wave receiving module 13 in the multi-interface integrated circuit module (the SIM card) receives a valid ultrasonic signal. Since it is the first card swiping, the multi-interface integrated circuit uninterruptedly measures the strength of the ultrasonic signal, but the measured ultrasonic signal strength does not serve as a condition for determining whether to allow card swiping of the mobile terminal. The mobile terminal demodulates and decodes the data information contained in the received ultrasonic signal, acquires the frequency of the radio communication, the modulation mode, the protocol, and the identity and authentication code and the like of the card reading device, and determines whether the identity of the card reading device is a card reading device supported by the multi-interface integrated circuit module. If the identity of the card reading device is a card reading device supported by the multi-interface integrated circuit module, the authentication code is transmitted to the card reading device 2 via radio by using a correct frequency channel. Upon receiving the authentication code, the card reading device 2 firstly comprises to determine whether the authentication code is transmitted by itself. If the authentication code is not the one transmitted by itself, the card reading device 2 makes no response, and continuously transmits the ultrasonic signals to recognize the card. If the authentication code is the one transmitted by itself, the card reading device 2 delays to calculate a distance D to the multi-interface integrated circuit module. If the distance d falls within a predefined secure distance range, the card reading device 2 makes a response to the multi-interface integrated circuit module via a radio signal, and then communicates with the multi-interface integrated circuit module via radio to establish a connection and read the identity of the employee, and compares whether the identify of the employee is authorized based on the attendance management system. If the identity is authorized, the card reading device 2 opens the door to make an access for the employee, and makes a record about the access. The multi-interface integrated circuit module uninterruptedly measures the strength of the received ultrasonic signals during the entire card swiping process, and records the maximum ultrasonic signal strength. Upon completion of card swiping, the ultrasonic signal strength threshold which allows card swiping is defined to $1/10$ of the maximum strength, which serves as the threshold which allows card swiping in the subsequent card swiping process. Subsequent card swiping upon the first card swiping operation: The ultrasonic wave transmitting module 23 of the card reading device 2 uninterruptedly transmits ultrasonic signals containing data information to recognize the card, wherein the data information comprises the frequency of a radio signal, the modulation mode, the protocol, the identity and authentication code and the like of the card reading device. In addition, the radio reception-transmission processing module 22 of the card reading device 2 stays in a receiving state, and waits for the radio signals transmitted by the multi-interface integrated circuit module. When the employee enters or exits the door of the company, the mobile phone of the employee is in close contact with the card reading device 2, and the ultrasonic wave receiving module 13 in the multi-interface integrated circuit module receives a valid ultrasonic signal. The multi-interface integrated circuit uninterruptedly measures the strength of the ultrasonic signal, comprises the measured ultrasonic signal strength with the ultrasonic signal strength threshold which allows card swiping. If the measured signal strength is greater than the threshold, card swiping is allowed, and the subsequent card swiping operations are performed. The mobile terminal demodulates and decodes the data information contained in the received ultrasonic signal, acquires the frequency of the radio communication, the modulation mode, the protocol, and the identity and authentication code and the like of the card reading device, and determines whether the identity of the card reading device is a card reading device supported by the multi-interface integrated circuit module. If the identity of the card reading device is a card reading device supported by the multi-interface integrated circuit module, the authentication code is transmitted to the card reading device 2 via radio by using a correct frequency channel. Upon receiving the authentication code, the card reading device 2 firstly comprises to determine whether the authentication code is transmitted by itself. If the authentication code is not the one transmitted by itself, the card reading device 2 makes no response, and continuously transmits the ultrasonic signals to recognize the card. If the authentication code is the one transmitted by itself, the card reading device 2 delays to calculate a distance D to the multi-interface integrated circuit module. If the distance d falls within a predefined secure distance range, the card reading device 2 makes a response to the multi-interface integrated circuit module via a radio signal, and then communicates with the multi-interface integrated circuit module via radio to establish a connection and read the identity of the employee, and compares whether the identify of the employee is authorized based on the attendance management system. If the identity is authorized, the card reading device 2 opens the door to make an access for the employee, and makes a record about the access. The multi-interface integrated circuit module uninterruptedly measures the strength of the received ultrasonic signals during the entire card swiping process, and records the maximum ultrasonic signal strength. Upon completion of card swiping, $\frac{1}{10}$ of the maximum ultrasonic signal strength measured during this card swiping is defined as a new threshold, and a maximum threshold of the new and previous thresholds is defined as an ultrasonic signal strength threshold which allows card swiping for the subsequent card swiping, serving as a threshold for determining whether to allow subsequent card swiping.

Embodiment 2: Application in Card Swiping in Shopping Malls, Wherein an Ultrasonic Signal Strength Threshold which Allows Card Swiping is Determined Using Method 1

As illustrated in FIG. 3, a card reader for use in reading credit cards in a shopping mall comprises a card reader primary circuit 6 and a card reading device 2, wherein an inner structure of the card reading device 2 is as illustrated in FIG. 4, and software and hardware that are communicated with a bank account management system. The mobile terminal is the mobile terminal of a user. The multi-interface integrated circuit module in the mobile phone of the user is a multi-interface integrated circuit module having the SIM function. The card swiping function module 16 in the multi-interface integrated circuit module comprises credit card swiping software and credit card identity authentication information. The multi-interface integrated circuit module is configured in the mobile phone, and comprises a SIM card, wherein an ultrasonic sensor is configured in the SIM card. The multi-interface integrated circuit module is predefined with an ultrasonic signal strength threshold which allows card swiping matching the model of the mobile phone. Since credit card imposes higher secure requirements but not high card swiping speed, the holder of the credit card needs to confirm the operation. Therefore, an acceleration measuring and processing module 14 needs to be configured in the multi-interface integrated circuit module applied in such a scenario. The card swiping process is as follows: The cashier operates the card reader 5, the card reading device 2 in the card reader 5 starts recognizing the card, and the ultrasonic wave transmitting module 23 in the card reading device 2 uninterruptedly transmits ultrasonic signals containing data information for recognizing the card. The data information comprises the frequency of the radio communication, the modulation mode, the protocol, and the identity and authentication code and the like of the card reading device. In addition, the radio reception-transmission processing module 22 of the card reading device 2 stays in a receiving state, and waits for the radio signals transmitted by the multi-interface integrated circuit module. When the user holds the mobile phone to make the mobile phone in close contact with the card reading device 2, the multi-interface integrated circuit module in the mobile phone receives a valid ultrasonic signal, measures the strength of the ultrasonic signal, and compares the measured strength with a predefined ultrasonic signal strength threshold which allows card swiping. If the measured strength is greater than the predefined threshold, card swiping is allowed, and the subsequent card swiping operations are performed. The multi-interface integrated circuit module parses out the data information contained in the received ultrasonic signal, acquires the frequency of the radio communication, the modulation mode, the protocol, and the identity and authentication code and the like of the card reading device, and determines whether the card reading device is a card reading device supported by the multi-interface integrated circuit module. If the card reading device is a card reading device supported by the multi-interface integrated circuit module, the authentication code and the distance acknowledgement code are transmitted via radio to the card reading device 2 by using a correct frequency channel, and the multi-interface integrated circuit module waits to receive the ultrasonic signals. Upon receiving the authentication code, the card reading device 2 firstly comprises to determine whether the authentication code is transmitted by itself. If the authentication code is not the one transmitted by itself, the card reading device 2 makes no response, and continuously transmits the ultrasonic signals to recognize the card. If the authentication code is the one transmitted by itself, a distance acknowledgement code is modulated into the ultrasonic signal, and transmitted via the ultrasonic wave transmitting module 23. Upon receiving the ultrasonic signal, the ultrasonic wave receiving module 13 of the multi-interface integrated circuit module parses out the distance acknowledgement code contained therein. If the received distance acknowledgement code does not comply with a practical transmitted distance acknowledgement code, card swiping is denied, and the card swiping operations of the multi-interface integrated circuit module are terminated; and if the strength of the ultrasonic signal is less than the threshold, card swiping is also denied. If the distance acknowledgement code complies with the practical transmitted distance acknowledgement code, delay time of the received distance acknowledgement code is converted into the distance d between the mobile terminal and the card reading device 2, and then the multi-interface integrated circuit module determines whether the distance d exceeds a predefined range of secure distance. If the distance d exceeds the predefined range of secure distance, card swiping is denied. If the distance falls within a range of distance which allows card swiping, the payment operations are started. In the payment operations, the multi-interface integrated circuit module communicates with the card reading device 2 via radio signals, thereby performing such operations as identity authentication. During the identity authentication, the card reader is in communication with the bank account management system, and the bank account management system further confirms validity of the identity of the multi-interface integrated circuit module. Upon confirmation of the identity information, the process enters the fee deduction procedure, and in the fee deduction procedure, the multi-interface integrated circuit module starts the acceleration measuring and processing module 14, waiting for a specific confirmation action of the user. Upon receiving the valid confirmation action from the user within a prescribed time duration, the acceleration measuring and processing module 14 continuously performs the entire fee deduction procedure; and otherwise, the fee deduction is denied, and the entire card swiping process is terminated. There are many mature encryption and decryption algorithms and protocols for identity authentication, which are not described herein any further.

Embodiment 3: Application in Small Cash Payment at Stalls or Flea Markets, Wherein an Ultrasonic Signal Strength Threshold which Allows Card Swiping is Determined Adaptively by Using Method 2

Figure 7:
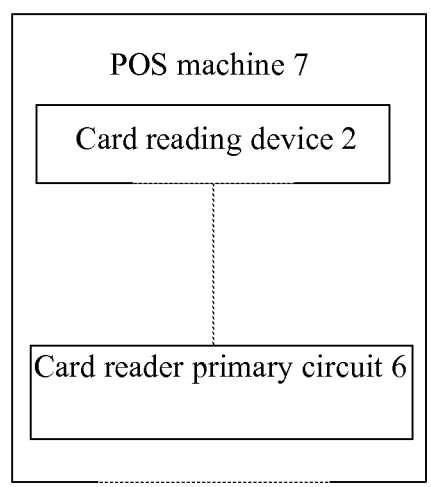
FIG. 7 illustrates a stall POS machine comprising a card reader primary circuit and a card reading device.

As illustrated in FIG. 7, a stall POS machine 7 comprises a card reader primary circuit 6 and a card reading device 2, wherein an inner structure of the card reading device 2 is as illustrated in FIG. 4, and software and hardware for offline fee deduction are configured in the card reader 5. The mobile terminal is the mobile terminal of a user. An ultrasonic sensor in a multi-interface integrated circuit module in the mobile phone of a user is adhered onto the inner surface of the shell of the mobile phone, as illustrated in FIG. 6. A card swiping function module 16 in the multi-interface integrated circuit module comprises software related to the offline payment, and the identity, authentication, account balance and the like information. In the following implementation, assume an ultrasonic signal strength threshold has been defined in the multi-interface integrated circuit module. The process for defining the ultrasonic signal strength threshold for initial card swiping is as illustrated in method 3, which is not described herein any further. Since payment at stalls imposes higher security requirements, to prevent unauthorized card swiping, during the entire card swiping process, the mobile terminal needs to be constantly in close contact with the POS machine. Therefore, during the entire card swiping process, the multi-interface integrated circuit module needs to uninterruptedly repeatedly measure and compare the received ultrasonic signal strength. Once the ultrasonic signal strength is less than the threshold, the card swiping process is immediately terminated. An ultrasonic wave transmitter may be quickly damaged due to heat generated by itself when the ultrasonic wave transmitter operates in a high strength transmission state for a very long period of time. However, if the ultrasonic wave transmitter transmits high strength ultrasonic waves for a short period of time, the transmitter may have sufficient time for heat dissipation, and thus may not be damaged due to high temperature. The card swiping process at a stall is as follows: The cashier at the stall operates the POS machine 7 to start the card swiping process, the card reading device 2 in the card reader 7 starts recognizing the card, and the ultrasonic wave transmitting module 23 in the card reading device 2 uninterruptedly transmits ultrasonic signals containing data information for recognizing the card. The data information comprises the frequency of the radio communication, the modulation mode, the protocol, and the identity and authentication code and the like of the card reading device. In addition, the radio reception-transmission processing module 22 of the card reading device 2 stays in a receiving state, and waits for the radio signals transmitted by the multi-interface integrated circuit module. When the user holds the mobile phone to make the mobile phone in close contact with the card reading device 2, the multi-interface integrated circuit module in the mobile phone receives a valid ultrasonic signal, measures the strength of the ultrasonic signal, and compares the measured strength with a predefined ultrasonic signal strength threshold which allows card swiping. If the measured strength is greater than the predefined threshold, card swiping is allowed, and the subsequent card swiping operations are performed. The multi-interface integrated circuit module parses out the data information contained in the received ultrasonic signal, acquires the frequency of the radio communication, the modulation mode, the protocol, and the identity and authentication code and the like of the card reading device, and determines whether the card reading device is a card reading device supported by the multi-interface integrated circuit module. If the card reading device is a card reading device supported by the multi-interface integrated circuit module, the authentication code is transmitted via radio to the card reading device 2 by using a correct frequency channel, and the multi-interface integrated circuit module waits to receive the ultrasonic signals. Upon receiving the authentication code, the card reading device 2 firstly comprises to determine whether the authentication code is transmitted by itself. If the authentication code is not the one transmitted by itself, the card reading device 2 makes no response, and continuously transmits the ultrasonic signals to recognize the card. If the authentication code is the one transmitted by itself, a new authentication code is modulated into the ultrasonic signal, and transmitted via the ultrasonic wave transmitting module 23. Upon receiving the ultrasonic signal, the ultrasonic wave receiving module 13 of the multi-interface integrated circuit module parses out the new authentication code contained therein. If the new authentication code fails to pass the authentication, card swiping is denied, and the card swiping operations of the multi-interface circuit module are terminated; and if the strength of the ultrasonic signal is less than the threshold, card swiping is also denied. If the new authentication code passes the authentication and the ultrasonic signal strength is greater than the threshold, the payment process is started. In the payment operations, the multi-interface integrated circuit module communicates with the card reading device 2 via radio signals, thereby performing such operations as identity authentication. The detailed process of card swiping is not illustrated herein any further. However, during the entire card swiping process, the multi-interface integrated circuit module uninterruptedly receives and measures the maximum strength of the received ultrasonic signals. Upon completion of card swiping, a new ultrasonic signal strength threshold is defined by using operations in step 2 in method 2. During the entire card swiping process, once the ultrasonic signal strength measured by the multi-interface integrated circuit is less than the threshold, the card swiping process is immediately terminated.

What is claimed is:

1. A card swiping method for determining card swiping of a mobile terminal by using ultrasonic signal strength, comprising:

closely contacting, by a mobile terminal, a card reading device, wherein a multi-interface integrated circuit in the mobile terminal receives a ultrasonic signal transmitted by an ultrasonic wave transmitter in the card reading device;

measuring, by the multi-interface integrated circuit, strength of the received ultrasonic signal, and comparing the measured strength with an ultrasonic signal strength threshold which allows card swiping; and if the strength of the received ultrasonic signal received by the multi-interface integrated circuit is greater than the ultrasonic signal strength which allows card swiping, interactively performing card swiping procedures by the multi-interface integrated circuit and the card reading device.

2. The card swiping method for determining card swiping of a mobile terminal by using ultrasonic signal strength according to claim 1, wherein the ultrasonic signal strength threshold which allows card swiping is defined by:

selecting a batch of mobile terminals of a specific model, respectively measuring a maximum strength of an ultrasonic signal transmitted by the card reading device and received by an ultrasonic sensor in each of the mobile terminals when each of the mobile terminal is not in contact with the card reading device, wherein the maximum strength is referred to as a non-contact maximum strength; and defining an ultrasonic signal strength threshold, which allows card swiping, of the mobile terminal of the model as the non-contact maximum strength.

3. The card swiping method for determining card swiping of a mobile terminal by using ultrasonic signal strength according to claim 2, wherein:

during card swiping, the multi-interface integrated circuit determines, according to the defined ultrasonic signal strength threshold which allows card swiping, whether to perform card swiping, and records a maximum ultrasonic signal strength measured during card swiping and compares 1/K of the measured maximum ultrasonic signal strength with the defined ultrasonic signal strength threshold which allows card swiping; if the 1/K of the measured maximum ultrasonic signal strength is greater than the defined ultrasonic signal strength threshold which allows card swiping, the multi-interface integrated circuit refreshes the defined ultrasonic signal strength threshold which allows card swiping to 1/K of the measured maximum ultrasonic signal strength, wherein K is in the range of 2 to 100.

4. The card swiping method for determining card swiping of a mobile terminal by using ultrasonic signal strength according to claim 1, wherein the ultrasonic signal strength threshold which allows card swiping in the multi-interface integrated circuit is adaptively defined by:

powering on the mobile terminal whereupon the multi-interface integrated circuit in the mobile terminal performs first card swiping upon power-on of the mobile phone, and ensuring security of card swiping by means of enabling a distance between the multi-interface integrated circuit and the card reading device to be less than a secure distance threshold;

measuring, by the multi-interface integrated circuit, ultrasonic signal strength during the first card swiping, and recording measured maximum ultrasonic signal strength; and defining the ultrasonic signal strength threshold which allows card swiping as 1/K of the measured maximum ultrasonic signal strength, wherein K is preferably in the range of 2 to 100.

5. The card swiping method for determining card swiping of a mobile terminal by using ultrasonic signal strength according to claim 4, wherein during next card swiping, the multi-interface integrated circuit records a maximum ultrasonic signal strength measured during card swiping, and compares 1/K of the measured maximum ultrasonic signal strength with the previously defined ultrasonic signal strength threshold which allows card swiping; if the 1/K of the measured maximum ultrasonic signal strength is greater than the previously defined ultrasonic signal strength threshold which allows card swiping, the multi-interface integrated circuit refreshes the defined ultrasonic signal strength threshold which allows card swiping to 1/K of the measured maximum ultrasonic signal strength, wherein K is in the range of 2 to 100.

6. The card swiping method for determining card swiping of a mobile terminal by using ultrasonic signal strength according to claim 1, wherein an ultrasonic sensor of the multi-interface integrated circuit is configured inside an interlayer of a shell of the mobile terminal.

7. The card swiping method for determining card swiping of a mobile terminal by using ultrasonic signal strength according to claim 1, wherein an ultrasonic sensor of the multi-interface integrated circuit is configured on an inner surface of a shell of the mobile terminal.

* * * * *